United States Patent Office 3,288,826
Patented Nov. 29, 1966

3,288,826
PROCESSES FOR MAKING
DEC-2-EN-9-ONE-1-ACID
Karl Eiter, Leverkusen, Germany, assignor to Farbenfabriken Bayer Aktiengesellschaft, Leverkusen, Germany, a corporation of Germany
No Drawing. Filed July 3, 1962, Ser. No. 207,408
Claims priority, application Germany, July 5, 1961,
F 34,349
6 Claims. (Cl. 260—413)

This invention relates to the preparation of dec-2-en-9-one-1-acid, and to novel intermediates employed in the production thereof. More particularly, the present invention relates to the preparation of trans-dec-2-en-9-one-1-acid, the "queen substance" of bee hives, and to novel intermediates prepared in the course of the subject processes.

It has been established heretofore by C. G. Buttler, R. D. Callow and N. C. Johnston (Nature, vol. 184, p. 1871 [1959]), that a decenone acid is present in the secretion of the queen of the honey bees (*Apis mellifera*), known as "queen substance," and have been able to show that this compound serves to inhibit the formation of queen bee cells in the egg stocks of worker bees. Genetically, this decenone acid appears to be associated with the 10-hydroxy-dec-2-ene-1-acid of gelée royale, or queen bee jelly, which has achieved substantial technical interest. It has also been demonstrated by R. D. Callow and N. C. Johnston (Bee World, vol. 41(6), page 152 [1960]); W. H. Brown and R. I. Freure (Canadian Journal of Chemistry, vol. 37, page 2042 [1959]); as well as M. Barbier, E. Ledevere, T. Reichstein and O. Schindler (Helv. Chim. Acta, vol. XVIII; Fasc. vol. VI, p. 1682 [1960]) that this decenone acid or "queen substance" is, more exactly, trans-dec-2-en-9-one-1-acid and have recently carried out a synthesis of this acid from the difficultly accessible cycloheptanone.

Accordingly, it has now been discovered that dec-2-en-9-one-1-acid and more particularly trans-dec-2-en-9-one-1 acid having the structural formula:

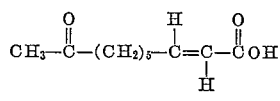

I can be readily produced by the process that involves the reaction by azeotropic distillation with, for example, compound, triphenyl phosphoric carbomethoxy methylene (III), in which reaction only one of the two formyl moieties present in the dialdehyde is actually reacted with the organophosphorus compound, to yield the hept-2-en-7-al-1-acid methyl ester (IV). It is noted that while triphenyl phosphoric carbomethoxy methylene is the preferred reactant for this particular step as well as in each of the instances in which it is recited hereinafter, the corresponding carboethoxy compound is also operative as indicated in the structurally recited reaction sequences appearing hereinafter.

The resulting heptenal acid methyl ester (IV) is condensed with acetone (V) according to the Knoevenagel reaction with piperidine, piperidine acetate, potassium hydroxide, barium hydroxide or ammonium acetate, to yield deca-2,7-dien-9-one-1-acid methyl ester (VI). The activated Δ⁷-double bond of this latter molecule is then partially hydrogenated with a lead or quinoline poisoned palladium catalyst to yield dec-2-en-9-one-1-acid methyl ester (VII and VIIa). If desired, the cis-components (VIIa) of this ester present in the latter reaction product mixture can be readily isomerized with catalytic amounts of iodine, whereupon the saponification of the resulting trans-dec-2-en-9-one-1-acid methyl ester (VII) with sodium carbonate (e.g., a 2-normal [N] solution thereof) yields the desired trans-dec-2-en-9-one-1-acid (I) [melting point of about 52° C. to 54° C.]. The reaction sequence thus described can be represented structurally as follows:

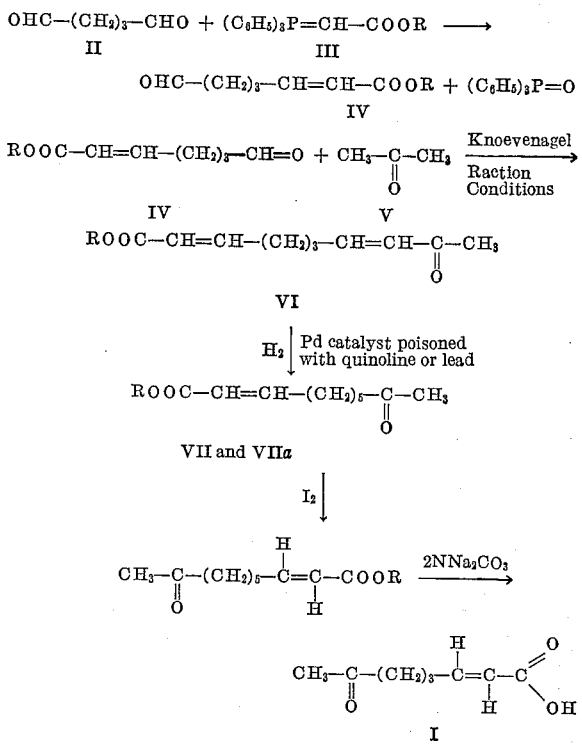

wherein R is an alkyl radical containing 1 to 2 carbon atoms, i.e., methyl or ethyl.

The glutaric dialdehyde (II) used as starting material is known from the literature and is technically easily accessible. The triphenyl phosphoric carbomethoxy methylene (III) used in the first step of the reaction is also readily obtainable, for example, from bromoacetic ester and triphenyl phosphine and treatment of the salt formed with an aqueous lye. By the reaction of this ylene in the presence of a solvent or by the reaction of the pure substance, it is surprising that the reaction could be carried out in the main with the reaction of one formyl group only, whereas in the literature, Wittig syntheses of bifunctional carbonyl compounds are known by the reaction of two carbonyl groups of the molecule with ylene (U. Schöllkopf, Angew. Chem., 71, 260 [1959].

The reaction of the glutaric dialdehyde (II) with the triphenyl phosphoric carbomethoxy methylene (III) is carried out in such a manner that 1.5–2 mols of glutaric dialdehyde are used per mol of triphenyl phosphoric carbomethoxy methylene (III) and the heat of reaction liberated upon admixture of the components is not allowed to exceed 80° C. It is also possible to work in solution, preferably in benzene solution, in which case, there are again used 1.5–2 mols of glutaric dialdehyde (II) per mol of triphenyl phosphoric carbomethoxy methylene (III) together with about 100 ml.–150 ml. benzene, the reaction being completed by heating under reflux for several hours. After separation of the triphenyl phosphine oxide, the remaining reaction product is fractionally distilled in a vacuum, first runnings of excess glutaric dialdehyde being separated, and recycled for reuse in the subject reaction. The hept-2-en-7-al-1-acid ester (IV) so formed is obtained in a yield of 99%.

In the second reaction step, the heptenal acid ester (IV) is condensed in acetone (V) solution with piperidine, piperidine acetate, ammonium acetate, catalytic amounts of alkali metal or alkaline earth metal hydroxides, such as sodium hydroxide, potassium hydroxide or barium hydroxide, in solid form or in the form of aqueous solutions, whereby 5 to 10 mols of acetone (V) can be used per mol of heptenal acid ester (IV). The reaction can be carried out at room temperature or at an elevated temperature; it has proved to be expedient to remove the water formed in the reaction of glutaric dialdehyde (II) with the known benzene, over a water separator provided with a drying agent. The reaction product obtained is deca-2,7-diene-9-one acid ester (VI) in a yield of 50%. Since in the molecule of the deca-2,7-dien-9-one acid ester (VI) there are two α,β-unsaturated carbon double bonds to one carbonyl group, it is unexpected that such a substance could be hydrogenated on the $\Delta^7$ double bond with quinoline-poisoned palladium catalysts or with the lead-poisoned palladium catalysts (Lindlar catalysts) known from Vitamin A chemistry. It has been found surprising therefore that with these catalysts the hydrogenation practically ceases after the saturation of the more strongly activated $\Delta^7$ double bond and that the dec-2-en-9-one-1-acid ester (VII) and (VIIa) can be produced in quantitative yields. Since it is known that in olefination reactions using ylenes, variable amounts of cis-ethylenes (VIIa) are formed, the cis-ester (VIIa) is isomerized into the corresponding trans-ester (VII) by allowing the crude dec-2-en-9-one-1 acid ester (VII and VIIa) to stand at room temperature for several hours in an inert organic solvent, e.g. petroleum ether, with traces of iodine.

The saponification of the trans-dec-2-en-9-one-1-acid methyl ester (VII) can readily be carried out with strong lyes or acids. By this procedure, however, besides small amounts of the expected trans-dec-2-en-9-one-1-acid (I), there are obtained acids which must result by an intramolecular cyclization. It has now been found, surprisingly, that the trans-dec-2-en-9-one-1-acid methyl ester (VII) can be converted in quantitative yield into the trans-dec-2-en-9-one-1-acid (I) when the ester is saponified with a 2N sodium carbonate solution (aqueous) alone or in the presence of solubilizing agents, such as dioxane, by boiling for several hours. The so-obtained trans-dec-2-en-9-one-1-acid (I) is identical in all chemical and physical properties with the acid known from the literature to have been isolated from the secretions of the queen bee.

It has also been found that trans-dec-2-en-9-one acid (I) can be produced by another process wherein glutaric dialdehyde (II) is condensed under the conditions of the aforesaid Knoevenager Reaction with acetone and catalytic amounts of piperidine, piperidine acetate, ammonium acetate or alkali metal or alkaline earth metal hydroxides, such as sodium hydroxide, potassium hydroxide or barium hydroxide in solid form or in the form of aqueous solutions, at room temperature or at temperatures of up to 100° C., to give oct-5-en-7-one-1-al (VIII) and this saturated keto aldehyde condensed either with malonic acid (IX) in the presence of piperidine-pyridine to give the deca-2,7-dien-9-one-1-acid (X) or reacted, by an ylide synthesis, with triphenyl phosphoric carbomethoxy methylene (III) to give the deca-2,7-dien-9-one-1-acid methyl ester (VI), the condensation being carried out in substance at temperatures of 50° C.–100° C. or, preferably, in benzene solution at the boiling temperature of the mixture.

This second or latter series of reaction sequences is represented structurally as follows:

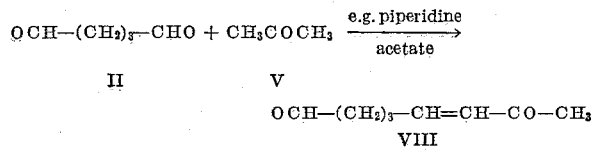

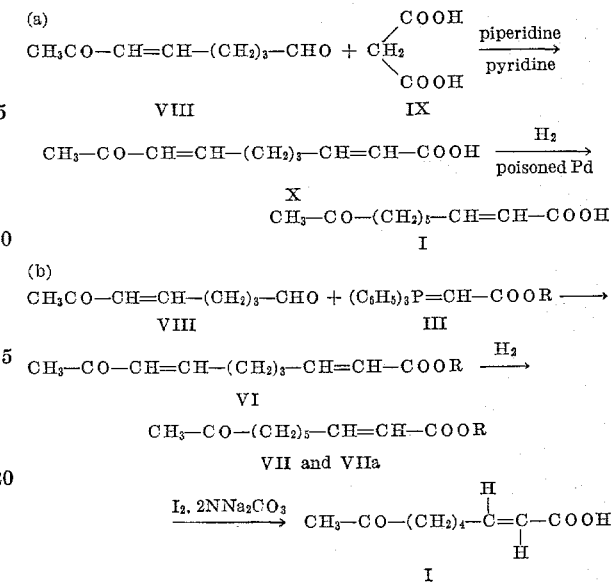

wherein R is as defined above.

It is noted that in the above sequence where the acid hydrogen of deca-2,7-dien-9-one-1-acid (X) and the values represented by R in the corresponding ester, i.e. methyl or ethyl, are embraced by the symbol R′, the reaction thereof with Lindlar catalyst is recited generically.

As noted in the last reaction sequence recited structurally hereinabove, not only the deca-2,7-dien-9-one carboxylic acid methyl ester (VI) obtained in the ylide synthesis, but also, the deca-2,7-dien-9-one-1-acid (X) obtained by malonic acid condensation with a cyclic amine mixture can be dissolved in, for example, methanol, glacial acetic acid or high-boiling petroleum ether, to be selectively hydrogenated at room temperature at the double bond in the α,β-position to the ketocarbonyl group with quinoline- or lead-poisoned palladium catalyst to form the corresponding dec-2-en-9-one-1-acid derivative thereof.

A further method of carrying out the process of preparing dec-2-en-9-one-1-acid (I) according to the invention, involves the hydrogenation, which occurs very rapidly, of oct-5-ene-7-one-1-al at the double bond in the 5-position thereof, with quinoline- or lead-poisoned palladium catalysts, under the same conditions as given above, i.e. at room temperature, preferably dissolved in high-boiling petroleum ether in the presence of quinoline- or lead-poisoned palladium catalysts (Lindlar catalysts). The octane-7-one-1-al (XI) can now be reacted in substance with triphenyl phosphoric carbomethoxy methylene (III) by means of the Wittig method or in benzene solution at temperatures of 50° C.–100° C. to give the dec-2-en-9-one-1-acid methyl ester (VII and VIIa). After separation of the triphenyl phosphine oxide and working up in the usual manner, there is separated the desired ester (VII and VIIa) which, in turn, can be treated with traces of iodine in petroleum ether for the purpose of a transisomerization. Thereafter the trans-ester (VII) is saponified with 2N sodium carbonate solution, in the presence, optionally, of solubilizing agents, such as alcohols or dioxane to give the trans-dec-2-en-9-one-1-acid (I).

The octane-7-one-1-al (XI) can also be condensed with malonic acid (IX) in pyridine solution in the presence of catalytic amounts of piperidine to give the trans-dec-2-en-9-one-1-acid (I). It is advantageous in this procedure to condense 1 mol of octane-7-one-1-al (XI) with 1.1-1.5 mols of malonic acid (IX) in twice the amount of pyridine, calculated on the weight of octanonal and malonic acid, dissolved at room temperature, in the presence of catalytic amounts of piperidine. After working up in the usual manner, there is obtained the desired product, trans-dec-2-en-9-one-1-acid, in good yields.

The aforesaid sequences are represented structurally as follows:

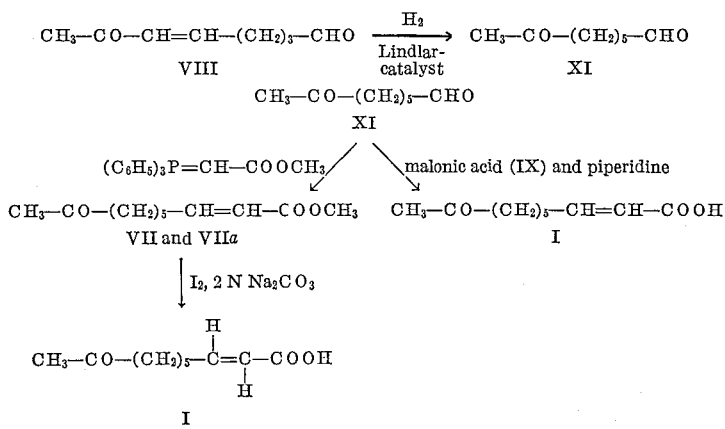

acid (XVII) is obtained which is hydrated with 80 percent formic acid and catalytic amounts of mercuric sulfate.

In a still further method for the production of the trans-dec-2-en-9-one - 1-acid (I) 6-bromohexane - 1-ol (XIII), readily obtainable from hexane-1,6-diol (XII) and hydrobromic acid, is reacted with lithium acetylide, sodium acetylide or calcium acetylide in liquid ammonia to give oct-7-yn-1-ol (XIV). Two to three mols of the alkali metal or alkaline earth metal acetylide are thus allowed to react with 1 mol of 6-bromohexan-1-ol (XIII) in liquid ammonia and the resultant oct-7-yn-1-ol (XIV) obtained in a pure state by fractionation under oil pump vacuum. Oct-7-yn-1-al (XV) can be obtained from the oct-7-yn-1-ol (XIV) by oxidation with chromic acid. A preferred manner of carrying out this oxidation consists of dehydrating the octynol (XIV) with a chromic acid ester solution in benzene to give oct-7-yn-1-al (XV). There are used about 1.5 mols of chromic acid and 4 mols of tert.-butanol per mol of octynol, the octynol (XIV) being dissolved in 3 to 5 times its amount by weight of benzene and the chromic acid ester mixture being present in the same amount of benzene as is necessary for the dissolving of the octynol. The oxidation is carried out at room temperature in 4 to 12 days (preferably 4 to 5 days), the whole reaction mixture being allowed to run into a sodium hydrogen sulphite solution at the end of the oxidation. The octynal (XV) can be distilled from this solution with steam. Oct-7-yn-1-al (XV) can also be prepared from oct-7-yn-1-ol (XIV) by oxidation in the usual manner by Oppenauer's method with aluminum isopropylate.

Oct-7-yn-1-al (XV), so obtained, is, according to the process of the invention, olefinated in a further reaction step with triphenyl phosphoric carbomethoxy methylene (III). One method of carrying this out consists in dissolving 1 mol of oct-7-yn-1-al (XV) in 1 to 2 times the amount by weight of dry benzene and adding thereto 1 to 1.1 mols of the triphenyl phosphoric carbomethoxy methylene (III), produced in the usual manner, whereupon the reaction mixture is heated for a period of 1 to 3 hours (preferably 1 to 2 hours), at 50° C.–100° C. (preferably 50° C.–80° C.) After cooling, the precipitated triphenylphosphine oxide is filtered off with suction and, after vacuum distillation, there is obtained dec-2-en-9-yne-1-acid methyl ester (XVI). The same reaction can also be carried out without solvent under the same conditions, such as of time and temperature.

A further manner of carrying out the process according to the invention consists in that the oct-7-yn-1-al (XV) is condensed directly with malonic acid (IX) and piperidine to give the dec-2-en-9-yne-1-acid (XVII). For this purpose, there are used, per mol of octynal (XV) employed, 1.5 to 2 mols of malonic acid (IX), the octynal (XV) and malonic acid (IX) being dissolved in the same amount by weight of dry pyridine and allowed to react with catalytic amounts of piperidine for 1 to 3 days (preferably 2 days). After working up, the dec-2-en-9-yne-1-

The hydration proceeds best when, per mol of dec-2-en-9-yne-1-acid (XVII) there are used 3 to 5 times the amount by weight of 80 percent formic acid and catalytic amounts of basic mercury sulfate; and the hydration is carried out for a period of 1 to 3 hours at 50° C.–150° C., (preferably at 100° C.) to yield dec-2-en-9-one-1-acid (I).

By hydration of the decenyne acid methyl ester (XVI) with 80 percent formic acid, together with catalytic amounts of basic mercuric sulfate, there is obtained, in turn, dec-2-en-9-one-1-acid methyl ester (VII) which, after optional isomerization with catalytic amounts of iodine, can be saponified with 2N sodium carbonate solution as described hereinabove to yield the desired trans-dec-2-en-9-one-1-acid (I). The aforesaid reaction sequences may be represented structurally as follows:

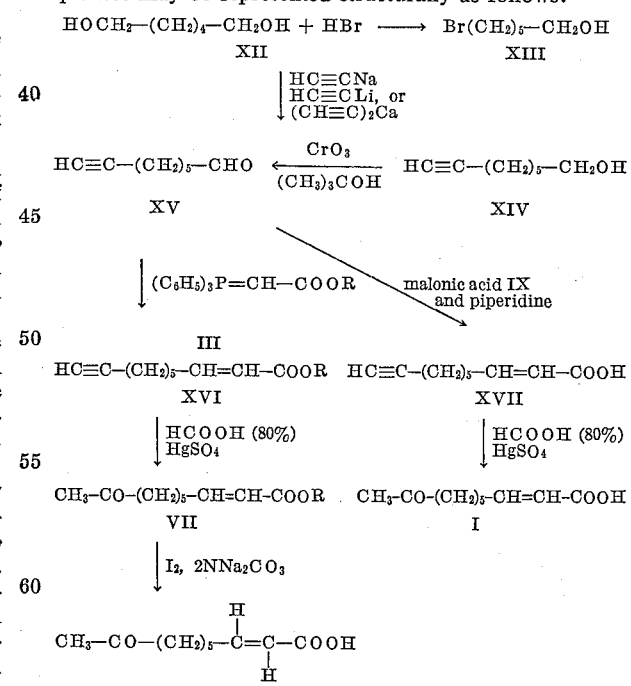

wherein R is as defined above. It is noted that compounds XVI and XVII above can be joined and represented generically by substitution of R' for the R of the ester XVI and the acid hydrogen of the acid XVII; R' in this event having the value represented above, i.e. alkyl of from 1 to 2 carbon atoms or hydrogen.

A further method for the production of the "queen substance," trans-dec-2-en-9-one-1-acid (I), consists in converting the hept-2-en-7-al-1-acid ester in an organometallic reaction with a propargyl halide, especially propargyl bromide, although propargyl chloride and propargyl iodide are, for example, both operative. The metallic component is magnesium, zinc or aluminum, whereby per mol of propargyl halide employed, there is used ⅔ gram atom of aluminum filings or aluminum powder, 1 gram atom of activated zinc dust or 1 gram atom of magnesium. The reaction is preferably carried out so that, in the case of working with zinc, the propargyl bromide is used under the conditions of the Reformatsky synthesis, while in the case of magnesium or aluminum the organometallic propargyl compound is first produced and this then reacted with the carbonyl compound.

The reaction of the organo-metallic compound of the propargyl halide (XVIII), where zinc is employed, is best carried out by allowing the mixture of propargyl halide (XVIII) and the hept-2-en-7-al-acid ester (IV) in an inert solvent, such as ether, tetrahydrofuran, benzene or mixtures of these solvents, to run into zinc dust; the mixture being heated briefly if necessary for the initiation of the reaction, and the further reaction being controlled by the rate of flow of the solution of the reaction components. The temperature range of the reaction should lie between 40° C. and 120° C., and preferably between 50° C. and 70° C. Where magnesium or aluminum is used, the propargyl halide (XVIII) is produced at temperatures between —10° C. and 30° C., especially with aluminum according to the process of copending United States application 98,291, filed March 27, 1961, and in the presence of an inert solvent, such as ether, tetrahydrofuran or benzene, especially tetrahydrofuran, and reacted as described above in an inert solvent at a temperature between —10° C. and 30° C. with a solution of an equimolar amount of the hept-2-en-7-al-1-ester (IV). After working up in the usual manner, there is obtained in good yield the 7-hydroxy-dec-2-en-9-yne-1-acid (XIX) ester as a rather thick colorless oil.

This hydroxy decenyne acid ester (XIX) can be hydrated and dehydrated simultaneously with dilute sulfuric acid or p-toluene sulfonic acid in the presence of catalytic amounts of basic mercury sulfate and a solubilizing agent, such as alcohol or dioxane, at the boiling point of this solvent mixture so that as the product of this reaction, after heating for a period of 5 to 30 minutes, there is obtained the deca-2,7-dien-9-one-1-acid ester which, after selective reduction and optional isomerization can be saponified with sodium carbonate solution to give the trans-dec-2-en-9-one-1-acid (I).

This reaction sequence is described structurally as follows:

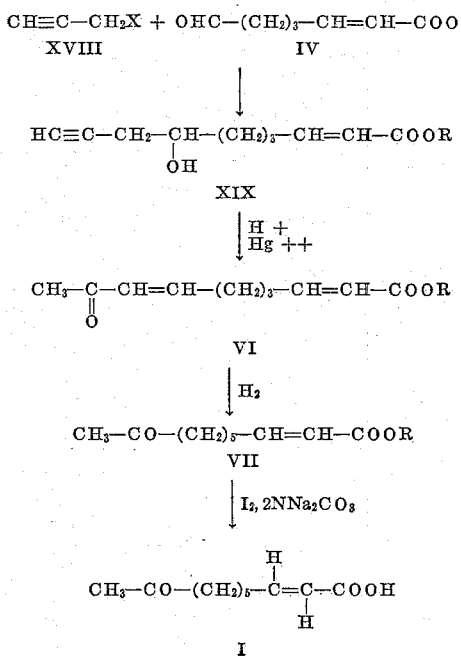

The following examples are given for the purpose of illustrating the invention further.

*Example 1*

(a) Preparation of the compound, hept-2-en-7-al-1-acid methyl ester, of the formula:

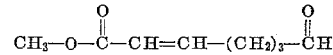

A mixture of 60.9 parts by weight of freshly distilled glutaric dialdehyde and 101.7 parts by weight of triphenyl phosphoric carbomethoxy methylene warms up when the two components are mixed together and is then stirred for 90 minutes at 80° C.–90° C. Fifty parts by volume of ether are then added thereto, the mixture cooled to —20° C. and the separated triphenyl phosphine oxide removed by filtering off with suction and subsequent washing with a small amount of a cold mixture of ether and petroleum ether. The filtrate is freed from solvent in a vacuum and the remaining residue distilled at 0.12 mm. Hg. 47.7 parts by weight of crude heptenal acid methyl ester distil over at 54° C.–75° C. and are again distilled. 39.1 parts by weight of hept-2-en-7-al acid methyl ester distil over at 58° C.–60° C./0.07 mm. Hg; $n_D^{20} = 1.4590$. The infra-red spectrum shows the methine band of the aldehyde group at 2725 cm.$^{-1}$, the C=O band at 1726 cm.$^{-1}$, as well as the related C=C band at 1655 cm.$^{-1}$ and a symmetrically substituted CH=CH transethylene band at 987 cm.$^{-1}$.

*Analysis:* $C_8H_{12}O_3$ (M.W. 156.18)—Calculated: C= 61.52; H=7.74; O=30.74. Found: C=61.45, 61.23, 61.44; H=7.97, 7.72, 7.85.

(b) Preparation of the compound, deca-2,7-dien-9-one-1-acid methyl ester, of the formula:

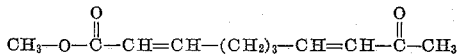

A mixture of 50 parts by weight of the hept-2-en-7-al-1-acid methyl ester and 100 parts by volume of dry acetone are mixed with 8 parts by weight of glacial acetic acid and 10 parts by weight of piperidine. The reaction mixture is then boiled under reflux for one hour, cooled, the excess acetone distilled off in a vacuum, the residue taken up in ether and the ether solution shaken out with water, dilute sulphuric acid, water, sodium bicarbonate solution and water until neutral, dried with sodium sulphate and, after evaporation of the ether, 40 parts by weight of substance remain. The distillation of this crude substance in a high vacuum gives a colorless distillate which goes over at 100° C.–150° C. (air bath temperature) and is again distilled; B.P.=120° C.–130° C./0.1 mm. Hg; $n_D^{20} = 1.4908$; yield: 20 parts by weight. The infra-red spectrum of the deca-2,7-dien-9-one-1-acid methyl ester shows the ester carbonyl band at 1720 cm.$^{-1}$, the α,β-unsaturated C=O band at 1676 cm.$^{-1}$, the unsaturated C=C band of the ester C=O at 1658 cm.$^{-1}$, as well as the unsaturated band of the keto-carbonyl at 1626 cm.$^{-1}$ and also a symmetrically substituted transethylene band at 980 cm.$^{-1}$.

*Analysis:* $C_{11}H_{16}O_3$ (M.W.=184.23)—Calculated: C= 67.32; H=8.22; O=24.46. Found: C=67.30; H=8.36.

2,4-dinitrophenyl hydrazone: the deca-2,7-dien-9-one acid methyl ester gives with sulphuric acidic dinitrophenyl hydrazine in alcohol a dinitrophenyl hydrazone which, recrystallized twice from tetrahydrofuran-ether-petroleum ether, melts at 139.5° C.

*Analysis:* $C_{17}H_{20}O_6N_4$—Calculated: C=54.25; H= 5.36; O=25.50; N=14.89. Found: C=54.40; H=5.59; O=25.93; N=14.98, 14.73.

(c) Preparation of the compound, dec-2-en-9-one-1-acid methyl ester, of the formula:

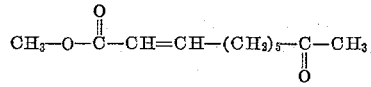

0.3 parts by weight of Lindlar catalyst are charged with hydrogen in 20 parts by volume of methanol and 10.55 parts by weight of the deca-2,7-dien-9-one-1-acid methyl ester in 20 parts by volume of methanol added thereto. After the calculated amount of hydrogen has been taken up, the hydrogenation is stopped, the catalyst filtered off, the filtrate freed from methanol in a vacuum and the residue distilled in a high vacuum at 0.001 mm. Hg and 80° C.–100° C. air bath temperature. The yield is quantitative; $n_D^{20}=1.4590$. The compound shows in the infrared spectrum the ester C=O band at 1720 cm.$^{-1}$, in which the saturated keto carbonyl band also falls, and the unsaturated C=C band of the ester carbonyl at 1658 cm.$^{-1}$. The presence of a symmetrically substituted CH=CH trans-ethylene grouping is recognizable by the band at 982 cm.$^{-1}$.

*Analysis:* $C_{11}H_{18}O_3$ (M.W.=198.3)—Calculated: C=66.63; H=9.15; O=24.22. Found: C=66.68; H=9.36.

(d) Preparation of the compound, dec-2-en-9-one-1-acid, of the formula:

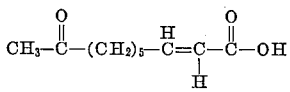

8.5 parts by weight of the dec-2-en-9-one acid methyl ester are dissolved in 20 parts by volume of petroleum ether and mixed with a solution of small iodine crystals in 5 ml. of petroleum ether and left to stand overnight. In the morning, the petroleum ether solution is shaken out with an N/10 sodium thiosulphate solution and water and the solvent driven off in a vacuum. The residue is boiled under reflux for 3 hours with 20 parts by volume of a 2N sodium carbonate solution and 20 parts by volume of dioxane, whereafter a clear reaction solution is observed. Thereupon, the dioxane and some water are driven off under water pump vacuum, the mixture cooled and the aqueous alkaline solution shaken out with ether. The aqueous phase is acidified with 95 parts by volume of 2 N hydrochloric acid, saturated with sodium chloride and shaken out with ether. There are obtained in quantitative yield 7.9 parts by weight of rapidly crystallizing acid which distils as a colorless, thickish oil at 0.001 mm. Hg and 110° C.–130° C. air bath temperature. When recrystallized from ether-petroleum ether, the acid melts at 53° C.–55° C. It shows an infra-red spectrum which is identical with the spectrum published in the literature for the "queen substance."

*Analysis:* $C_{10}H_{16}O$ (M.W.=148.24)—Calculated: C=65.20; H=8.76; O=26.04. Found: C=64.94; H=9.05.

*Example 2*

(a) Preparation of the compound, 7-hydroxy-dec-2-en-9-yne-1-acid methyl ester, of the formula:

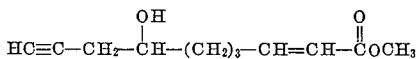

A mixture of 15.8 parts by weight of the hept-2-en-7-al-1-acid methyl ester and 14.4 parts by weight of propargyl bromide are dissolved in a mixture of 10 parts by volume of absolute tetrahydrofuran and 20 parts by volume of absolute ether and a part therefrom allowed to flow, under nitrogen and with stirring, into 9.2 parts by weight of activated zinc dust. After brief heating, the reaction sets in, whereupon the remaining portion of the mixture of the reaction components is introduced. For the completion of the reaction, the reaction mixture is briefly after-stirred and mixed with ammonium chloride in the usual manner and worked up. There are obtained 18.9 parts by weight of a yellowish oil which distils in a high vacuum at 0.001 mm. Hg and 100° C.–120° C. air bath temperature; $n_D^{20}=1.4872$.

The infra-red spectrum shows the OH band at 3510 cm.$^{-1}$, the C≡CH band at 3280 cm.$^{-1}$, the $\alpha,\beta$-unsaturated C≡C band at 2115 cm.$^{-1}$, the $\alpha,\beta$-unsaturated ester C=O band at 1729 cm.$^{-1}$, as well as the related C=C band at 1663 cm.$^{-1}$. At 984 cm.$^{-1}$, there lies the characteristic band for the symmetrically disubstituted trans-ethylene configuration.

*Analysis:* $C_{11}H_{16}O_3$ (M.W.=196.25)—Calculated: C=67.32; H=8.22; O=24.46. Found: C=67.28; H=8.34.

(b) Preparation of the compound, deca-2,7-dien-9-one-1-acid methyl ester, having the structural formula recited in Example 1(b):

5.1 parts by weight of 7-hydroxy-dec-2-en-9-yne-1-acid methyl ester are dissolved in 30 parts by volume of dioxane and 0.2 part by weight of basic mercury sulphate added. While stirring, the reaction mixture is heated to boiling and 15 parts by volume of a 20% aqueous sulphuric acid allowed to run in, whereupon the reaction mixture is further heated for 10 minutes. The bright yellow solution is cooled, saturated with sodium chloride and extracted with ether. The ethereal phase is washed out with a sodium chloride solution, dried over sodium sulphate and evaporated. There remain behind 5.6 parts by weight of an oil which is fractionated in a high vacuum at 0.001 mm. Hg and 90° C.–130° C. air bath temperature. There is obtained the deca-2,7-dien-9-one-1-acid methyl ester with a refractive index $n_D^{20}=1.4868$, the infrared spectrum of which was completely identical with the ester produced above by another method. As distillation after-runnings there is obtained a small amount of the 7-hydroxy-dec-2-en-9-one-1-acid methyl ester.

(c) Preparation of dec-2-en-9-one-1-acid methyl ester and dec-2-en-9-one-1-acid having the structural formulae recited in Example 1(c) and 1(d), respectively:

Dec-2-en-9-one-1-acid methyl ester and sequentially dec-2-en-9-one-1-acid are prepared in the manner described in Example 1(c) and 1(d), respectively:

What is claimed is:

1. Process for preparing trans-dec-2-en-9-one-1-acid that comprises reacting glutaric dialdehyde with an organophosphorus compound of the formula:

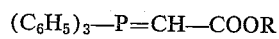

wherein R is a lower alkyl of from 1 to 2 carbon atoms, to form the corresponding hept-2-en-7-al-1-acid methyl ester of the formula:

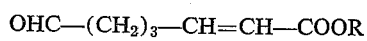

wherein R is as defined above; reacting said ester with acetone in the presence of a member selected from the group consisting of piperidine, piperidine acetate, ammonium acetate, an alkaline earth metal hydroxide and an alkali metal hydroxide to form a deca-2,7-dien-9-one-1-acid ester of the formula:

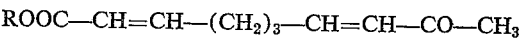

wherein R is again as defined above, reacting said latter ester with a palladium catalyst poisoned with a member selected from the group consisting of lead and quinoline to form a dec-2-en-9-one-1-acid ester of the formula:

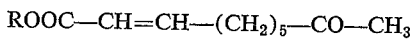

wherein R is as defined above; and reacting said latter ester sequentially with a catalytic amount of iodine and sodium carbonate.

2. Process for preparing trans-dec-2-en-9-one-1-acid that comprises reacting glutaric dialdehyde with acetone in the presence of a member selected from the group consisting of piperidine, piperidine acetate, ammonium acetate, an alkaline earth metal hydroxide and an alkali metal hydroxide to form the keto aldehyde, oct-5-en-7-one-1-al; condensing said keto aldehyde with an organophosphorus compound of the formula:

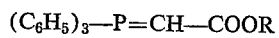

wherein R is a lower alkyl of from 1 to 2 carbon atoms; to form a deca-2,7-dien-9-one-1-acid ester of the formula:

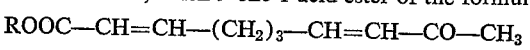

wherein R is as defined above; reacting said latter ester with a palladium catalyst poisoned with elemental hydrogen in the presence of a member selected from the group consisting of lead and quinoline to form a dec-2-en-9-one-1-acid ester of the formula:

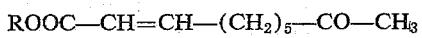
ROOC—CH=CH—(CH$_2$)$_5$—CO—CH$_3$ wherein R is as defined above; and reacting said latter ester sequentially with a catalytic amount of iodine and sodium carbonate.

3. Process that comprises reacting an organometallic compound of a propargyl halide wherein the metallic component is selected from the group consisting of magnesium, zinc and aluminum, with a hept-2-en-7-al acid ester of the formula:

OHC—(CH$_2$)$_3$—CH=CH—COOR wherein R is a lower alkyl radical of 1 to 2 carbon atoms, to form a 7-hydroxy-dec-2-en-9-yne-1-acid ester of the formula:

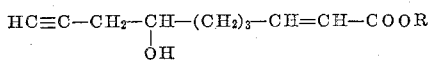
HC≡C—CH$_2$—CH—(CH$_2$)$_3$—CH=CH—COOR
           |
           OH wherein R is as defined above; hydrating and dehydrating said ester to form a dec-2,7-dien-9-one-1-acid ester of the formula:

CH$_3$—CO—CH=CH—(CH$_2$)$_3$—CH=CH—COOR wherein R is as defined above; hydrogenating said latter ester with elemental hydrogen in the presence of a palladium catalyst poisoned with a member selected from the group consisting of lead and quinoline, to form a dec-2-en-9-one-1-acid ester of the formula:

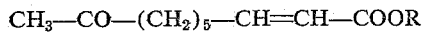
CH$_3$—CO—(CH$_2$)$_5$—CH=CH—COOR wherein R is as described above; and sequentially reacting said ester with a catalytic amount of iodine and sodium carbonate to form trans-dec-2-en-9-one-1-acid.

4. Process that comprises reacting a deca-2,7-dien-9-one acid compound of the formula:

CH$_3$—CO—CH=CH—(CH$_2$)$_3$—CH=CH—COOR' wherein R' is a member selected from the group consisting of hydrogen, methyl and ethyl, with elemental hydrogen in the presence of a palladium catalyst poisoned with a member selected from the group consisting of quinoline and lead and recovering therefrom the corresponding dec-2-en-9-one-1-acid derivative thereof.

5. Process that comprises hydrogenating deca-2,7-dien-9-one acid methyl ester with elemental hydrogen in the presence of a palladium catalyst poisoned with a member selected from the group consisting of quinoline and lead and recovering therefrom dec-2-en-9-one-1-acid methyl ester.

6. Process that comprises hydrogenating deca-2,7-dien-9-one acid with elemental hydrogen in the presence of a palladium catalyst poisoned with a member selected from the group consisting of quinoline and lead and recovering therefrom dec-2-en-9-one-1-acid.

References Cited by the Examiner

UNITED STATES PATENTS

| | | | |
|---|---|---|---|
| 2,475,916 | 7/1949 | Reiff et al. | 260—413 |
| 2,498,133 | 2/1950 | Ralston | 260—405.6 |
| 2,521,677 | 9/1950 | VanderWeele | 260—601 |
| 2,646,437 | 7/1953 | Dickey | 260—410.9 |
| 2,789,141 | 4/1957 | Worms et al. | 260—593 |
| 2,810,761 | 10/1957 | Wheeler | 260—601 |
| 2,819,318 | 1/1958 | Hill | 260—632 |
| 2,820,805 | 1/1958 | Beets et al. | 260—413 |
| 2,836,628 | 5/1958 | Miller | 260—632 |
| 2,894,011 | 7/1959 | Pommer | 260—410.9 |
| 2,913,497 | 11/1959 | Grimme et al. | 260—593 |
| 3,112,330 | 11/1963 | Oughton | 260—410.9 |
| 3,162,659 | 12/1964 | Callow et al. | 260—413 |

OTHER REFERENCES

Callow et al.: Chemical Abstracts, vol. 54, p. 23096, 1960.

Willard et al.: The Journal of the American Oil Chemists Society, vol. 38, No. 6 (1961), pp. 282 to 286.

CHARLES B. PARKER, *Primary Examiner.*

DANIEL D. HORWITZ, *Examiner.*

A. H. SUTTO, *Assistant Examiner.*